(12) United States Patent
Hollenstein

(10) Patent No.: US 7,614,281 B2
(45) Date of Patent: Nov. 10, 2009

(54) METHOD AND SYSTEM FOR DETECTING A LEAKAGE IN A PIPELINE OR SIMILAR CONDUIT

(75) Inventor: Walter Hollenstein, Düdingen (CH)

(73) Assignee: PP-Technologies AG, Düdingen (CH)

( * ) Notice: Subject to any disclaimer, the term of this patent is extended or adjusted under 35 U.S.C. 154(b) by 498 days.

(21) Appl. No.: 10/593,421

(22) PCT Filed: Mar. 18, 2005

(86) PCT No.: PCT/IB2005/050946

§ 371 (c)(1),
(2), (4) Date: Oct. 4, 2006

(87) PCT Pub. No.: WO2005/090938

PCT Pub. Date: Sep. 29, 2005

(65) Prior Publication Data

US 2008/0229807 A1    Sep. 25, 2008

(30) Foreign Application Priority Data

Mar. 19, 2004   (CH) .................................... 0164/04

(51) Int. Cl.
*G01M 3/28* (2006.01)
(52) U.S. Cl. .................................... 73/40.5 R
(58) Field of Classification Search ............... 73/40.5 R
See application file for complete search history.

(56) References Cited

U.S. PATENT DOCUMENTS

| | | | | |
|---|---|---|---|---|
| 3,862,349 A | * | 1/1975 | Watts | ........................ 174/11 R |
| 4,651,559 A | | 3/1987 | Horigome et al. | |
| 5,686,674 A | * | 11/1997 | Lowry et al. | ................ 73/865.8 |
| 6,070,452 A | * | 6/2000 | Brannan | ................... 73/40.5 R |
| 6,450,972 B1 | | 9/2002 | Knoll | |

FOREIGN PATENT DOCUMENTS

EP    1 371 325    12/2003

OTHER PUBLICATIONS

Written Opinion of the International Searching Authority in PCT/IB2005/050947 mailed Sep. 6, 2005.

* cited by examiner

*Primary Examiner*—John Fitzgerald
(74) *Attorney, Agent, or Firm*—Nixon & Vanderhye P.C.

(57) ABSTRACT

The invention concerns a method and a system for detecting a leakage in a pipeline (4) or similar conduit characterized by the use of an umbilical flexible tube (1) laid within and along said pipeline (4), the displacement of a solution column (2) within said umbilical flexible tube (1), the measurement of the pressure (P) at the front (3) of said solution column (2) and the localization of said front (3) from the said measured pressure (P).

6 Claims, 3 Drawing Sheets

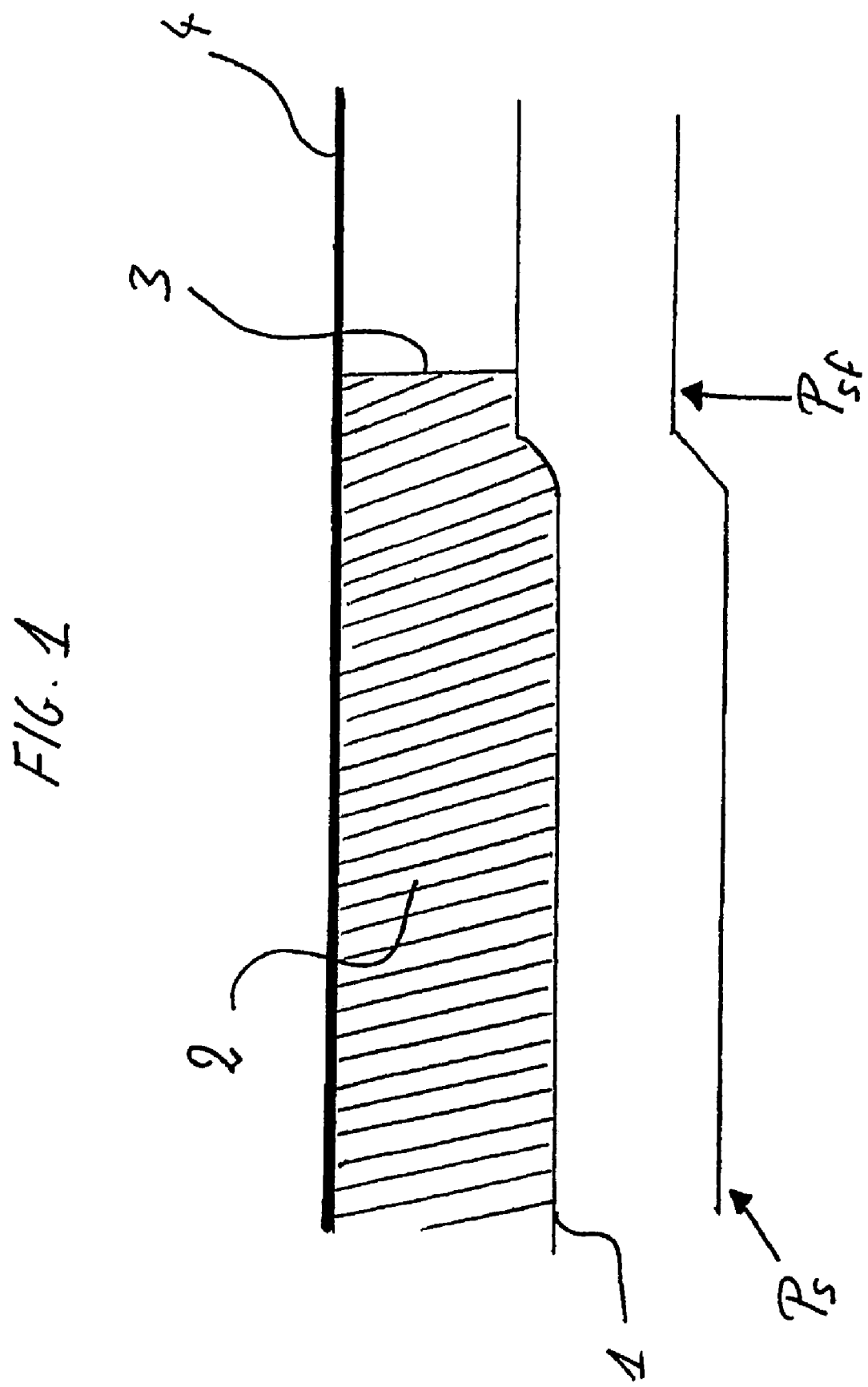

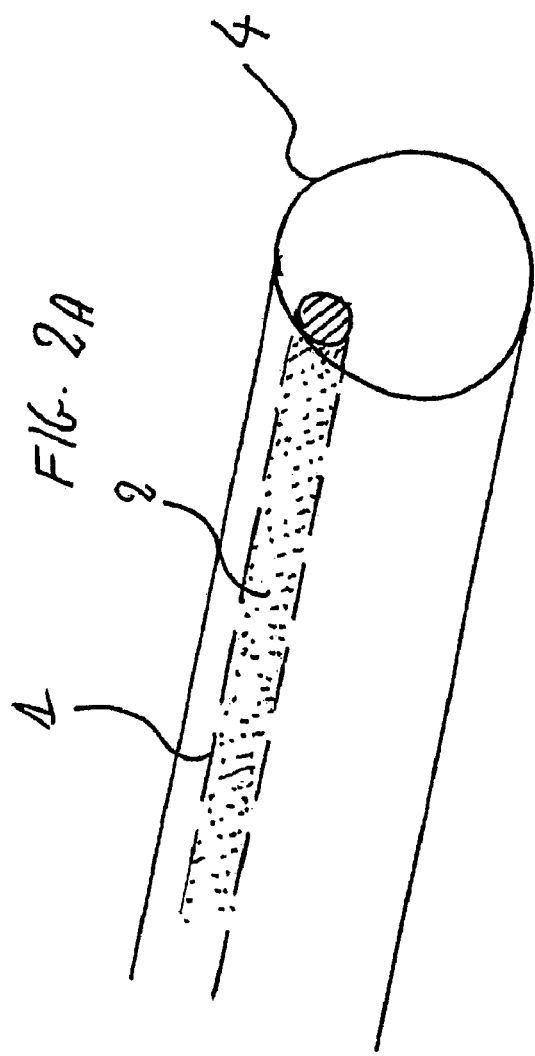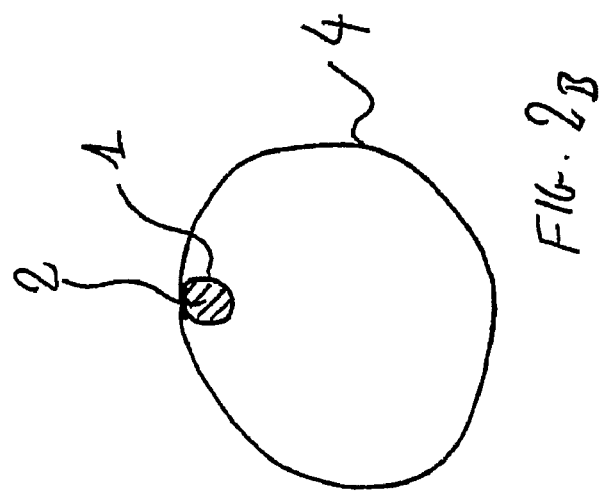

METHOD AND SYSTEM FOR DETECTING A LEAKAGE IN A PIPELINE OR SIMILAR CONDUIT

This application is the U.S. national phase of international application PCT/IB2005/050946 filed 18 Mar. 2005 which designated the U.S. and claims benefit of CH PCT/CH2004/000164, dated 19 Mar. 2004, the entire content of which is hereby incorporated by reference.

FIELD OF THE INVENTION

The present invention relates to pipelines or similar conduits which are used for the transfer of fluids such as gas, water or oil.

More precisely the invention relates to methods and systems for detecting leakages in such conduits.

SUMMARY OF THE INVENTION

The invention relates to a method for detecting a leakage in a pipeline or similar conduit characterized by the use of an umbilical flexible tube laid within and along said pipeline, the displacement of a solution column within said umbilical flexible tube, the measurement of the pressure at the front of said solution column and the localization of said front from the said measured pressure.

The pressure profile measurement can be similar to the pressure profile measurement used in the medical field as disclosed in U.S. Pat. No. 6,450,972, International patent application PCT/03/00227 or in European patent application EP 1 371 325 A1.

The invention also relates to a System for detecting and localizing a leakage in a pipeline or similar conduit using the previous cited method characterized by the fact that it comprises:

An umbilical flexible tube adapted to be laid within and along a pipe;
Pumping means adapted for moving a solution within said umbilical flexible tube;
Pressure measuring means adapted for determining the pressure at the front of a solution moving within said flexible tube;
Localization means adapted for determining the position of a solution front from the measured pressure of said front.

DETAILED DESCRIPTION OF THE INVENTION

The invention will be better understood with the detailed description below together with the following figures:

FIG. 1 schematically shows a pipe and an umbilical flexible tube containing a solution.

FIGS. 2A and 2B is a front view of the pipe and umbilical tube of FIG. 1.

Figure 3:
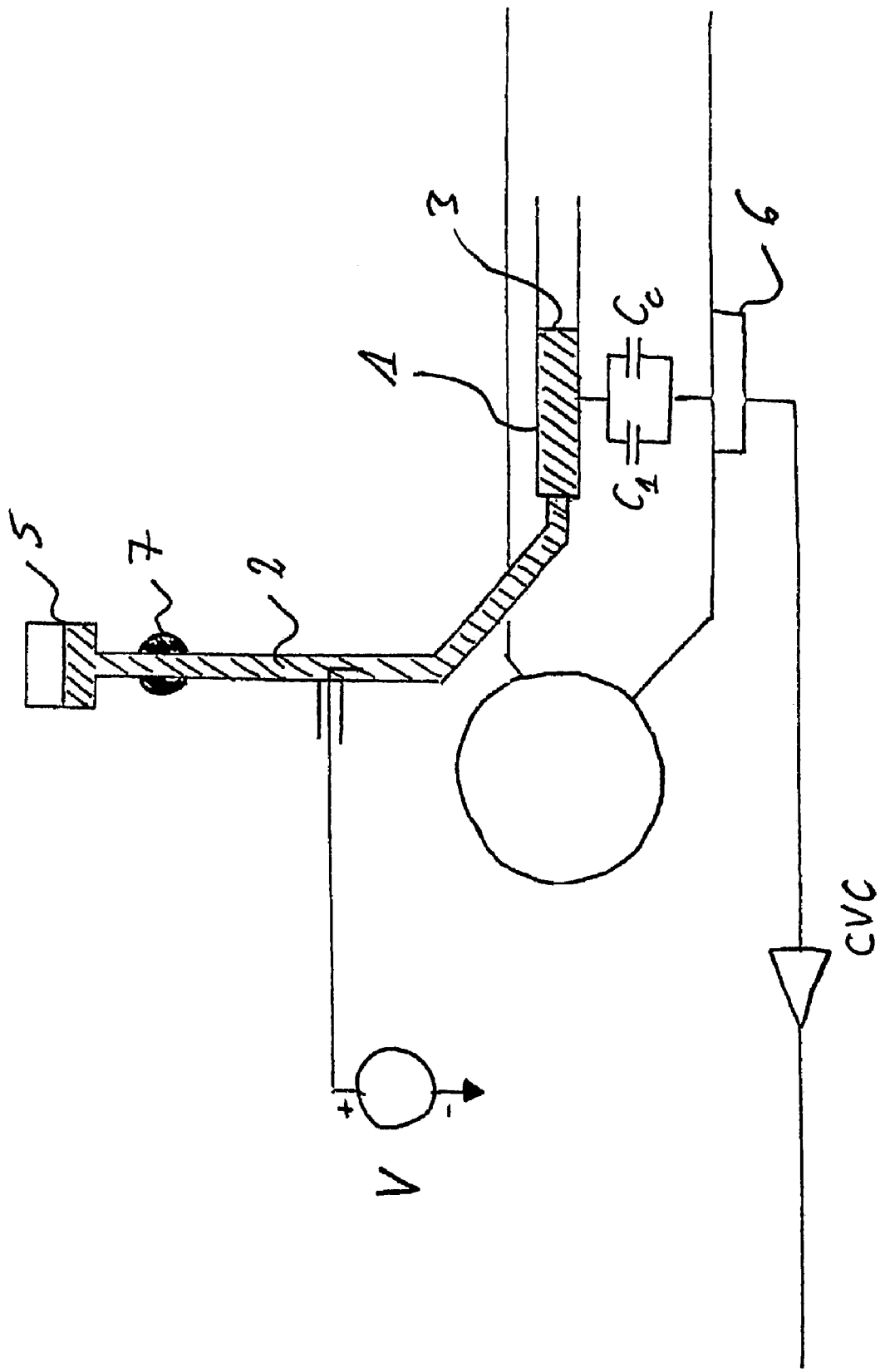
FIG. 3 shows an embodiment of a device according to the invention.

The principle underlying the invention consists in measuring the pressure profile and, optionally, the temperature profile of a solution front 3, e.g. a saline solution, traveling through an umbilical tube 1 laid within and along a pipe 4 (see FIGS. 1 and 2).

The solution 2 travels through the pipe 4 and its front pressure $P_{sf}$ is frequently measured creating thereby a discrete pressure $P_s$ and, optionally, temperature profile.

Whenever a pressure drop/increase is encountered the solution front will be deformed and its measured, pressure will drastically change. The pressure profile $P_s$ and the front pressure $P_{sf}$ are graphically shown on FIG. 1. Since the position of the solution front 3 along the umbilical tube 1 can be determined (e.g. according to the methods disclosed in the previous cited patent documents), a leakage point can be localized.

In a preferred embodiment of the invention (see FIG. 3) a saline solution 2 is used. The position of its front 3 along the umbilical tube 1 can be determined in measuring the electrical resistance or capacity of the saline solution.

A deformation of the saline solution front 3 caused by the pressure outside the umbilical tube 1 will lead to a geometry change and thereby a change in the electrical resistance or capacitance which, for instance, can be measured by a leakage current and a current to voltage converter CVC as disclosed in PCT/CH03/00227.

The following system may be used with the previous cited embodiment. It includes:

A PPT umbilical tube 1 laid within and along the main pipe which comprises a magnetic flat top in order to fix it to the main pipe, a flexible U-shape bottom capable of being deformed by pressure variation, an external coating with an electrical conducting paint in order to transmit signals (on FIG. 3, the main pipe and the flexible U-shape bottom are not shown in order to facilitate the understanding of the invention);

A saline solution 2 to be pumped through the pipe from one end to the other;

Pressure and optionally temperature sensors and, when a current to voltage converter CVC is used, two capacitive, sensors. The sensors preferably have a thick membrane in order to avoid parasitic effects and are placed at the beginning and at the end of the umbilical tube;

A pump 7 adapted for moving the saline solution from a reservoir 5 to the umbilical tube 1.

With device illustrated in FIG. 3, one capacitance $C_c$ is modulated by external pressure at the wave front 3 of the saline solution 2. $C_c$ varies with pressure and position of the saline solution front 3 inside the umbilical tube 1. The voltage is proportional to the values of $C_c$.

$C_1$ represents another capacitance. V represents an excitation voltage applied to the solution 2 and the reference 6 represents an electrode.

When used with oil pipelines, to have a rough screening, in order to localize a leakage or an important drop in the pressure, a measuring point every 200 meters is sufficient. In such a case, a software makes the extrapolation between these points.

The invention is of course not limited to the above cited examples. It includes any pipe leakage, detecting method which can dynamically measure the pressure and the position of a solution front traveling in a flexible tube laid within and along a pipe.

The invention claimed is:

1. A method for detecting a leakage in a pipeline or similar conduit characterized by:
   use of an umbilical flexible tube laid within and along said pipeline,
   displacement of a solution column which has a front and a pressure (P) at the front and which is within said umbilical flexible tube,
   measurement of the pressure (P) at the front of said solution column, and
   localization of said front from the said measured pressure,
   wherein the leakage is determined by detection of a change in pressure (P) at the front of the solution column.

2. A method according to claim 1 wherein there is a temperature at the front, the method further comprising measurement of the temperature at the front of said solution column.

3. A method according to claim 1 wherein the solution is a saline solution and wherein the measurement of the pressure (P) is obtained via measurement of electrical resistance or capacity.

4. A system for detecting and localizing a leakage in a pipeline or similar conduit using the method of claim 1, the system comprising:

an umbilical flexible tube adapted to be laid within a pipe;

a pumping means adapted for moving a solution within said umbilical flexible tube;

a pressure measuring means adapted for determining the pressure (P) at the front of a solution moving within said flexible tube;

a localization means adapted for determining the position of a solution front from the measured pressure (P) of said front.

5. A system according to claim 4 further comprising a temperature measuring means adapted for determining the temperature at the front of a solution moving within said flexible tube.

6. A system according to claim 4 further comprising capacitive sensors adapted for measuring the electrical capacity of a solution moving within said flexible tube.

* * * * *